United States Patent [19]

Wren

[11] 4,394,777
[45] Jul. 19, 1983

[54] METHOD OF AND SYSTEM FOR CLASSIFYING EMERGENCY LOCATING TRANSMITTERS AND EMERGENCY POSITIONS INDICATING RADIO BEACONS

[75] Inventor: Paul E. Wren, Severna Park, Md.

[73] Assignee: The United States of America as represented by the Administrator of the National Aeronautics and Space Administration, Washington, D.C.

[21] Appl. No.: 102,592

[22] Filed: Dec. 12, 1979

[51] Int. Cl.³ .............................................. H04B 7/26
[52] U.S. Cl. ...................................... 455/95; 455/38; 455/99; 340/27 R; 340/539
[58] Field of Search ...................... 455/91, 96, 95, 98, 455/99, 100, 116, 115, 35, 36, 38, 63, 1, 7; 340/25, 27 R, 33, 506, 526, 527, 539; 370/110; 332/14; 343/101, 102

[56] References Cited

U.S. PATENT DOCUMENTS

| | | | |
|---|---|---|---|
| 2,945,094 | 7/1960 | Metzger | 370/110 |
| 3,510,777 | 5/1970 | Gordon | 455/38 |
| 3,928,805 | 12/1975 | Mactaggart | 455/63 |
| 4,103,236 | 7/1978 | Deserno | 455/1 |
| 4,155,042 | 5/1979 | Permut | 455/38 |
| 4,241,326 | 12/1980 | Odom | 455/99 |

*Primary Examiner*—Tommy P. Chin
*Attorney, Agent, or Firm*—Ronald F. Sandler; John R. Manning; John O. Tresansky

[57] ABSTRACT

During a distress call, a distress location transmitter 10 generates a high frequency carrier signal 40 that is modulated by a predetermined distress waveform characteristic 29. The classification of user associated with the distress call is identified by periodically interrupting modulation 42; user classification is determined by the repetition rate of the interruptions, the interruption periods, or both.

10 Claims, 12 Drawing Figures

METHOD OF AND SYSTEM FOR CLASSIFYING EMERGENCY LOCATING TRANSMITTERS AND EMERGENCY POSITIONS INDICATING RADIO BEACONS

ORIGIN OF THE INVENTION

The invention described herein was made by an employee of the United States Government, and may be manufactured and used by or for the Government for governmental purposes without the payment of any royalties thereon or therefor.

TECHNICAL FIELD

The present invention relates generally to distress signal beacon devices such as emergency locating transmitters (ELTs) and emergency position indicating radio beacons (EPIRBs), and more particularly toward a method of and apparatus for identifying user classification associated with distress signals transmitted by such devices.

BACKGROUND ART

There are presently in existence in the United States approximately 190,000 emergency locating transmitters (ELTs) required by law on all small aircraft travelling more than twenty-five miles from an airport and about 6,000 emergency position indicating radio beacons (EPIRBs) required on certain classes of marine vessels. ELTs and EPIRBs are essentially the same device which transmits an audio tone on 121.5 MHz and 243 MHz indicating that a distress incident has occurred. In general, the ELTs are activated by gravitational forces (impact) whereas the EPIRBs are activated in response to water. The audio tone generated by these devices is provided by a distress modulation waveform having a downward sweep of at least 700 Hz within a band of 1,600 Hz and 300 Hz at a rate of 2 Hz to 4 Hz. These specifications are predetermined by legislation so that the required transmitted signals may be recognized by individuals listening for the characteristic tone on the 121.5 MHz and 243 MHz carrier frequencies. The Air Force Rescue Coordination Center (AFRCC), for example, receives information from others, i.e., FAA flight service stations, airports, Civil Air Patrol, etc, who monitor the 121.5 MHz and 243 MHz carrier frequencies and respond to distress signals by notifying search and rescue personnel (SAR), such as the Civil Air Patrol, to search for the location of the distress transmission and initiate rescue operations. Since the distress transmission contains no information other than the fact of a distress, however, SAR have no way of obtaining any advance information concerning classification of the distress. It would be very helpful to SAR to know, for example, whether the source of the distress signal is a downed aircraft, marine vessel, camper, hiker or ski patrol to better coordinate rescue operations. There is presently no means for determining whether the distress signal is associated with any of these classes of users or even whether the signal is generated by a civilian or military craft (whose ELTs transmit only 243 MHz) using an ELT or an EPIRB. There exists a need, therefore, for some means to enable determination of classification of the user initiating a distress transmission.

Since the characteristic distress signal generated by ELTs and EPIRBs comprise carriers that are modulated by the characteristic distress tone, which demodulates to a siren like sound, the distress signal is difficult to detect electronically. Although the signal has been developed primarily for detection by a human operator, there is presently a need for electronic equipment that may be carried in satellites to augment existing search and rescue capabilities. Since specifications for the distress signals transmitted by ELTs and EPIRBs have been determined by legislation, however, it is not possible to significantly depart from the present specifications.

One object of the present invention, therefore, is to provide a method of and apparatus for identifying user classification of an ELT or EPIRB generated distress signal.

Another object is to provide a method of and system for identifying user classification in an ELT or EPIRB generated distress signal without departing from the legislated range of signal specifications.

Another object is to provide a method of and system for identifying user classification in an ELT or EPIRB generated distress signal without requiring complex transmission circuitry and wherein existing ELT and EPIRB units can be adapted to generate a user classification identification signal.

DISCLOSURE OF INVENTION

The present invention involves a modification of the standard distress location transmitter, such as an ELT or EPIRB, to include user classification information in the distress transmission. The standard distress signal transmitter comprises an oscillator for supplying carrier signals at 121.5 MHz and 243 MHz to an antenna during a distress call. The output of the oscillator is gated to the antenna through a gate that is controlled by the output of a free running multivibrator. The repetition rate of the multivibrator is varied cyclically by a sweep generator operating at a sweep frequency within a range specified in the United States by the Federal Communications Commission. The multivibrator operates continuously to provide an uninterrupted audio tone to the carriers so that the demodulated signal has a continuous siren-like characteristic. In accordance with the invention, the output of the multivibrator is periodically disabled to interrupt modulation of the carrier signals. Interruption of modulation is controlled by a timer that may be synchronized to the sweep generator signal or alternatively may be asynchronous. The rate at which the carrier signal modulation is interrupted or the magnitude of the interruption periods or both corresponds to user classification associated with the distress transmission.

Still other objects and advantages of the present invention will become readily apparent to those skilled in this art from the following detailed description, wherein there has been shown and described only the preferred embodiments of the invention, simply by way of illustration of the best modes contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
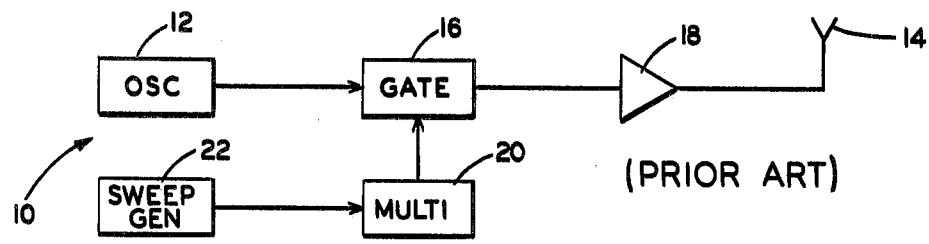
FIG. 1 is a block diagram of an ELT or EPIRB of the prior art of which the present invention is a modification.

Referring to FIG. 1, a conventional emergency locating transmitter (ELT) or emergency position indicating radio beacon (EPIRB), identified generally by the numeral 10, comprises an oscillator 12 that generates the legislatively assigned 121.5 MHz carrier frequency. The output of oscillator 12 is supplied to an antenna 14 through a gate 16 and amplifier 18. Amplifier 18 is non-linear and provides a frequency doubled signal of 243 MHz as well as providing an amplified 121.5 MHz signal. The gate 16 is a conventional on-off signal gating device that selectively passes to antenna 14 or blocks the carrier signals generated by oscillator 12. Gate 16 is controlled by an output of a free running multivibrator 20 which is in turn controlled to vary in frequency within limits and which repetitively turns the gate 16 on and off as a function of the pulse repetition rate and duty cycle of the multivibrator. Preferably, multivibrator 20 generates a constant duty cycle pulse train, the repetition rate of which is controlled by the output of a sweep generator 22. The waveform characteristic of sweep generator 22 (a ramp varying between 2 Hz to 4 Hz) which is also legislatively assigned, controls multivibrator 20 that, in turn, provides an audio tone sweeping downwardly for at least 700 Hz between the border frequencies of 1,600 Hz and 300 Hz at a rate of 2 Hz to 4 Hz. Operationally, there is no reason why the frequency sweep cannot be upward, but legislation provides otherwise. The pulse repetition rate of the signal generated by multivibrator 20 to control gate 16 thus is normally a train of constant duty cycle pulses cyclically varying in repetition rate within a band of at least 700 Hz between 1,600 Hz and 300 Hz at a rate of 2 Hz to 4 Hz. The signal applied to antenna 14 is a constant amplitude carrier that is periodically interrupted at a decreasing rate within the audio band to develop a siren-like sound in the speaker of a conventional AM receiver.

Figure 4A:
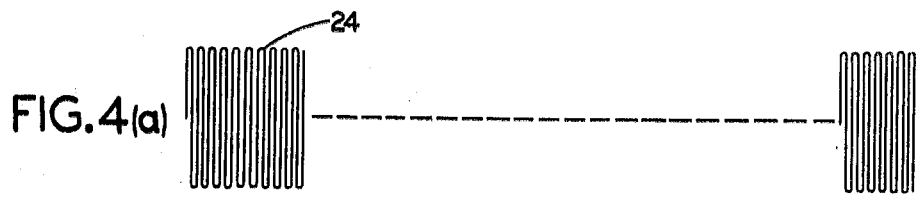
FIGS. 4a–4h are waveforms used for describing the present invention.
Figure 4B:
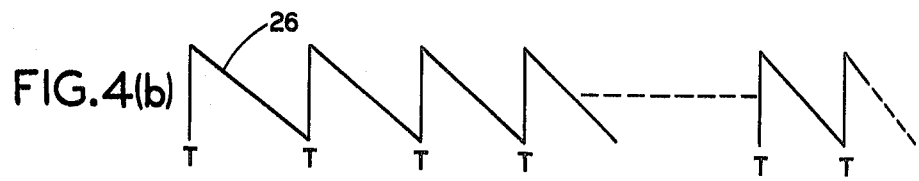
Figure 4C:
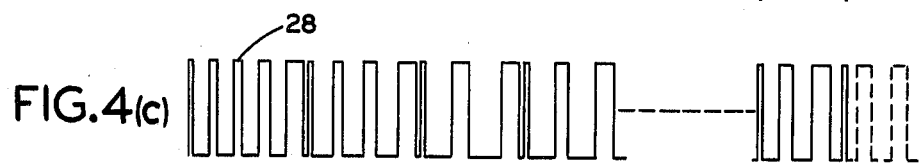
Figure 4D:
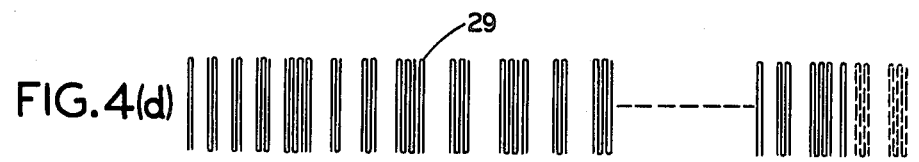
Figure 4E:
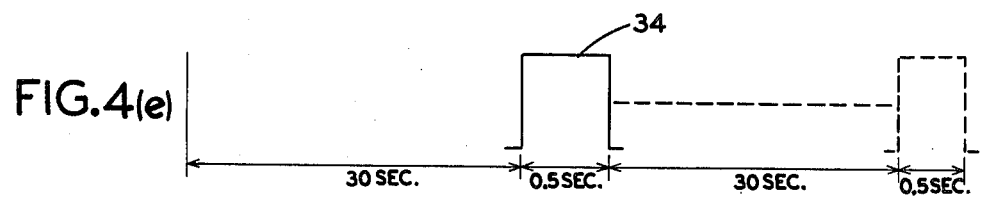

Typical waveforms developed in the standard ELT or EPIRB 10 shown in FIG. 1 are illustrated in FIGS. 4a–4d. The waveform 24 shown in FIG. 4a represents the standard high frequency carrier signal developed by oscillator 12. The frequency of the waveform 24 shown in FIG. 4a is illustrated as being at a much lower frequency than it is in practice and has a time base different from that in FIGS. 4b–4h so that the sinusoidal characteristic of the carrier waveform can be distinguished for the purpose of illustration. The signal generated by sweep generator 22 is shown in FIG. 4b wherein sawtooth signal 26 is constituted by a train of free running sawtooth waveforms that in practice are generated at a rate of 2 Hz to 4 Hz. This control signal is applied to the multivibrator 20 to sweep the multivibrator output downward at least 700 Hz in the specified frequency band of 1,600 Hz to 300 Hz as noted above. The sawtooth 26 is illustrated as having negative slope but could alternatively have positive slope so long as the multivibrator 20 is designed to sweep downwardly in repetition rate as a function of the sawtooth signal. The output of multivibrator 20, shown in FIG. 4c, is a train of constant duty cycle pulses 28 having a repetition rate that varies as a function of the sawtooth signal 26 that is supplied to the control input of the multivibrator. The time base of FIGS. 4c–4h is greatly enlarged from the actual time base to make visible the variable spacing between pulses for the purpose of illustration. FIG. 4d illustrates signal 29 at the output of gate 16 to be supplied to antenna 14 through amplifier 18. The output signal 29 in FIG. 4d corresponds to carrier 24 (FIG. 4a) gated by waveform 28 (FIG. 4c). The depicted frequency of carrier waveform 29 is again much larger than the actual frequency for the purpose of illustration. It is understood that the waveform 29 shown in FIG. 4d is equivalent to an amplitude modulated carrier to the extent that it will be demodulated in a conventional amplitude modulation demodulator which will provide to a headphone or speaker the siren-like tone that is characteristic of a distress transmission.

Whereas the modulated carrier signals generated by standard ELTs and EPIRBs are continuous and thereby carry no additional information as well as are very difficult to detect by automatic detection circuitry, the modulation is periodically interrupted in accordance with the invention for predetermined, fixed time periods. The repetition rate of the periodic interruptions, the length of each interruption period, or both, carry information identifying the classification of user originating the distress transmission, e.g., whether the transmission is originating from an aircraft, marine craft, hiker, mountain climber, et cetera. The magnitudes of the modulation time interruption periods and time periods between interruptions are not critical so long as the two periods are identifiable to the listener. Typical modulation interruption periods and periods between successive interruptions are respectively 0.5 second and 30 seconds.

Figure 2:
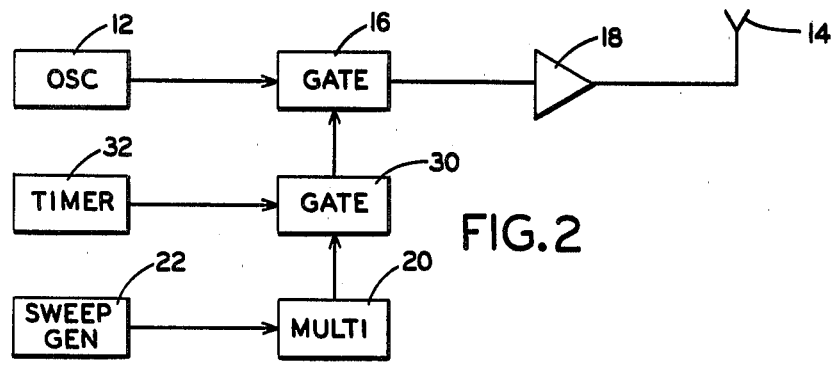
FIG. 2 is a block diagram of one embodiment of the invention, wherein modulation of the carrier signal is periodically interrupted under control of an asynchronous timer.
Figure 3:
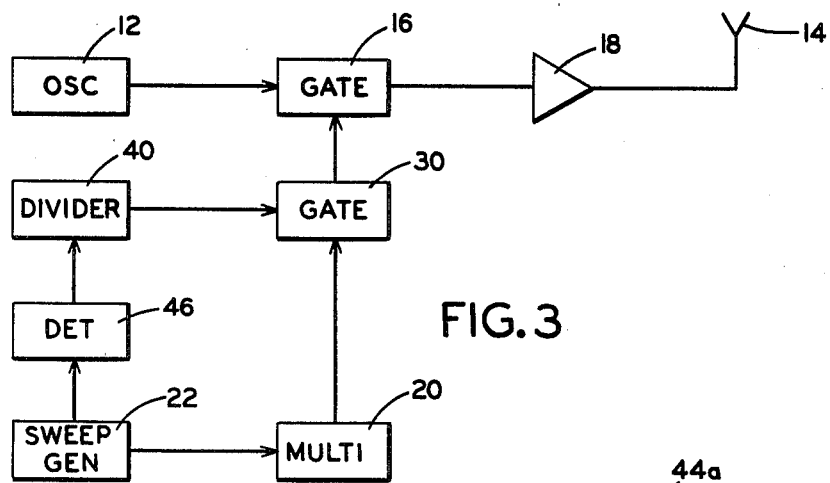
FIG. 3 is a block diagram of another embodiment wherein modulation of the carrier signal is periodically interrupted under control of a counter synchronized to the sweep generator generating the modulation frequency sweeps.

Two systems for periodically interrupting modulation in a standard ELT or EPIRB are shown in FIGS. 2 and 3. In accordance with FIG. 2, a standard ELT or EPIRB circuit corresponding to circuit 10 in FIG. 1 includes a second gate 30 connected between multivibrator 20 and the standard gate 16 to selectively block the output of multivibrator 20 from the control input of gate 16. During the blocking periods, gate 16, which is normally closed, passes the carrier signals generated by oscillator 12 to antenna 14 through amplifier 18 without interruption. Thus, still assuming that the modulation interruption periods have durations of 0.5 second each, and are repeated every 30 seconds, the signal generated by timer 32 is identified by 34 in FIG. 4e. Accordingly, the output of multivibrator 20 is prevented from controlling the input of standard gate 16 for 0.5 second intervals every 30 seconds. These intervals identify a particular classification of user transmitting the distress signal, such as a downed aircraft. It is understood, of course, that other combinations of modulation interruption periods and intervals between periods may be assigned to identify other user classifications, such as marine craft, ski patrol, et cetera.

Figure 4F:
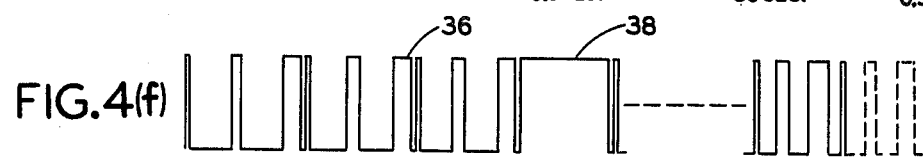
Figure 4G:
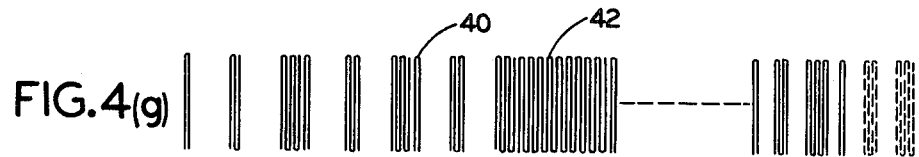
Figure 4H:
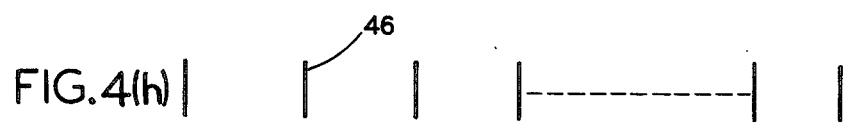

The output of gate 30 in FIG. 2 identified by waveform 36 (FIG. 4f) is similar to waveform 28 shown in FIG. 4c except that the output of the multivibrator 20 is disabled for the interruption periods as shown, for example, by period 38 in FIG. 4f. FIG. 4g, which illustrates waveform 40 at the output of gate 16 in FIG. 2, is similar to the waveform 29 in FIG. 4d with the inclusion of unmodulated periods 42 corresponding to periods 38 in FIG. 4f. Since the periods 42 in the modulated carrier 40 are demodulated as a tone absence, it is understood that the demodulated tone corresponding to the waveform shown in FIG. 4g is the characteristic distress tone interrupted for 0.5 second intervals every 30 seconds.

Whereas timer 32 in FIG. 2 is asynchronous, FIG. 3 shows an embodiment of the present invention wherein the asynchronous timer 32 is replaced by a counter or divider 44 that is synchronized to the output of sweep generator 22 through a detector 46. The detector 46 generates a pulse 48 (see FIG. 4h) each time the negatively sweeping sawtooth waveform 26 in FIG. 4b resets at the times T on the time axis. Thus, the output of detector 46 is a pulse train having a repetition rate equal to the repetition rate of the sawtooth waveform and synchronized thereto.

Figure 3A:
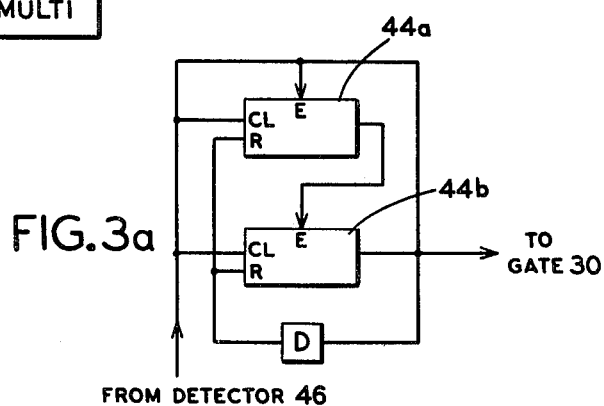
FIG. 3a is a diagram of a circuit for synchronizing the counter to the output of the sweep generator of FIG. 3.

Divider 44 is a conventional digital divider circuit that divides pulses from detector 46 by a predetermined number to develop a longer time period for controlling the on-off intervals of intermediate gate 30. Both the 0.5 second and 30 second intervals can be obtained from the time base developed by sweep generator 22 by providing two counter portions 44a and 44b shown in FIG. 3a within the counter 44. Counter 44a generates the repetition rate period by dividing the detector pulses 46 by a first number while counter portion 44 develops the interruption time period by dividing the same detector pulses by a second, larger number. Assuming a sweep generator frequency of 2 Hz, for example, the first counter 44a is connected to divide the 2 Hz detector pulses by 60 to develop the 30 second repetition interval whereas the second counter portion 44b is connected to divide the detector pulses by 4 to develop the 0.5 second interruption periods. Counter portion 44b is enabled by the output of counter portion 44a. Thus, counter portion 44b generates a signal at the end of each 30 second interval enabled by counter portion 44a at terminal E. The counter portion 44b, once enabled, generates a 0.5 second interval signal synchronized to the output of detector 46. Following the 0.5 second timing interval, the output of counter portion 44b is fed back to reset inputs R of counter portions 44a and 44b which resets the two counters to generate an additional cycle of timing signals to gate 30. The output of counter 44 is thus identical to the output of timer 32 except that the counter output is synchronized to sweep generator 22.

Any standard ELT or EPIRB can be easily retrofitted by adding gate 30 and timer 32 or counter 44 to generate the modulation interruption periods described above to identify classes of transmitted distress signals. The system and method enable a listener to make identification by synchronizing his watch to an interruption period and observing the time to a second interruption period. A 30 second interval, for example, might identify an aircraft distress, whereas a 15 second interval could correspond to a sea craft. As another possibility, a 0.5 second interruption period could correspond to a military craft, whereas a one second interruption period could correspond to a civilian craft. It is thus apparent that a substantial amount of information can be conveyed concerning classification of distress by varying either the interruption period, repetition rate of the interruption period, or both.

As an additional advantage of the present invention, the addition of interruption periods to the normally continuous distress signal enables the distress signal to be more conveniently detected by an automatic receiver since the interruption periods can be locked onto by a conventional phase locked loop, for example, and interruption periods measured to automatically display distress classification.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

I claim:

1. A distress location transmitter, comprising:
   oscillator means for generating a carrier signal to be supplied to an antenna during a distress call;
   means for modulating said carrier signal with a distress characteristic waveform; and
   means for periodically disabling said modulating means at a predetermined rate corresponding to one of a plurality of classes of user for said distress location transmitter in providing a period of unmodulated carrier to identify said user class associated with said distress call.

2. The transmitter of claim 1, wherein said modulating means includes gate means for interrupting said carrier signal, and multivibrator means for repetitively operating said gate means within a predetermined range of repetition rates.

3. The transmitter of claim 2, wherein said modulating means further includes sweep generator means for cyclically varying the repetition rate of said multivibrator means within said predetermined range.

4. The transmitter of claim 3, wherein said disabling means includes timing means for periodically gating the output of said multivibrator.

5. The transmitter of claim 3, wherein said disabling means includes means for generating a periodic signal having a first constant magnitude for a first predetermined period of time and a second constant magnitude for a second predetermined period of time, and means responsive to said first magnitude of said periodic signal for enabling said multivibrator output and to said second magnitude of said periodic signal for disabling said multivibrator output.

6. The transmitter of claim 5, including means for synchronizing said timing means to said sweep generator.

7. The transmitter of claim 6, wherein said synchronizing means includes means for detecting a predetermined portion of each sweep generator output waveform and means for generating synchronization pulses for driving said means for generating a periodic signal.

8. A distress location transmitter, comprising:
   oscillator means for generating a carrier signal to be supplied to an antenna during a distress call;

means for modulating said carrier signal with a distress waveform;

means for enabling an output of said modulating means for a first period of time and for disabling said output for a second period of time; and means for controlling the time periods of said means for enabling and disabling in accordance with one of a plurality of classes of user for said distress location transmitter in providing a period of unmodulated carrier to identify said user class associated with said distress call.

9. A method of identifying a user class associated with a distress call comprising a carrier signal transmitted at a predetermined frequency and modulated by a distress characteristic waveform, the method comprising the step of periodically interrupting modulation of said carrier signal at a predetermined repetition rate corresponding to one of a plurality of classes of user for said distress call in providing a period of unmodulated carrier to identify the user class.

10. A method of identifying a user class associated with a distress call comprising a carrier signal transmitted at a predetermined frequency and modulated by a distress characteristic waveform, the method comprising the step of periodically interrupting modulation of said carrier signal for a predetermined time duration corresponding to one of a plurality of classes of user for said distress call in providing a period of unmodulated carrier to identify the user class.

* * * * *

UNITED STATES PATENT AND TRADEMARK OFFICE
CERTIFICATE OF CORRECTION

PATENT NO. : 4,394,777
DATED : July 19, 1983
INVENTOR(S) : Paul E. Wren

It is certified that error appears in the above-identified patent and that said Letters Patent is hereby corrected as shown below:

On the title page delete the assignee at line [73] which reads:

"The United States of America as represented by the Administrator of the National Aeronautics and Space Adminstration, Washington, DC."

Signed and Sealed this

Twenty-ninth Day of November 1983

[SEAL]

Attest:

GERALD J. MOSSINGHOFF

Attesting Officer

Commissioner of Patents and Trademarks